United States Patent [19]

Umebara et al.

[11] Patent Number: 5,005,669
[45] Date of Patent: Apr. 9, 1991

[54] COMMODITY DATA INPUTTING DEVICE

[75] Inventors: Takao Umebara; Takeshi Yagome, both of Shizuoka, Japan

[73] Assignee: Tokyo Electric Co., Ltd., Tokyo, Japan

[21] Appl. No.: 526,881

[22] Filed: May 22, 1990

[30] Foreign Application Priority Data

May 24, 1989 [JP] Japan .................................. 1-130951

[51] Int. Cl.$^5$ .............................................. G06K 7/10
[52] U.S. Cl. .......................................... 186/61; 108/6; 248/397; 235/383
[58] Field of Search .......................... 186/61; 364/405; 235/383, 385, 145 R, 462; 248/371, 284, 921, 923, 918, 291, 920, 397; 108/6, 7, 9

[56] References Cited

U.S. PATENT DOCUMENTS

| 3,902,034 | 8/1975 | Isozaki | 235/145 R X |
| 3,975,050 | 8/1976 | McKee | 248/371 X |
| 4,067,533 | 1/1978 | Kazaoka et al. | 248/397 |
| 4,350,098 | 9/1982 | Shirono et al. | 108/6 |
| 4,421,035 | 12/1983 | Gubbe et al. | 108/6 |
| 4,693,444 | 9/1987 | Williams et al. | 248/923 X |
| 4,838,383 | 6/1989 | Saito et al. | 186/59 |
| 4,963,721 | 10/1990 | Kohno et al. | 186/61 X |

FOREIGN PATENT DOCUMENTS 63-45665 2/1988 Japan .
63-45666 2/1988 Japan .

Primary Examiner—David A. Bucci
Assistant Examiner—William M. Hienz
Attorney, Agent, or Firm—Oblon, Spivak, McClelland, Maier & Neustadt

[57] ABSTRACT

A commodity data inputting device including a keyboard retained on a base which is pivotally connected with a mounting member. A plurality of engaging portions are formed at one of opposed side portions between the mounting member and the base, and are arranged along an arc defined about a pivotal axis of the base. An engaging bar is normally engaged with one of the engaging portions by a biasing force applied toward the pivotal axis. A retaining portion is formed at the other of the opposed side portions to retain the engaging bar at its opposite ends. A release lever normally abutting against the engaging bar is displaceable by a biasing force larger than the biasing force applied to the engaging bar. An operating portion for operating the release lever is connected thereto through a wire and a spring connected with the wire.

2 Claims, 6 Drawing Sheets

COMMODITY DATA INPUTTING DEVICE

FIELD OF THE INVENTION AND RELATED ART STATEMENT

The present invention relates to a commodity data inputting device having a keyboard.

FIG. 9 is a perspective view of a known commodity data inputting device in the prior art. Referring to FIG. 9, a body 102 of a bar code scanner 101 is fixed at a rear position of a substantially central portion of a sacker table 100 on which a shopping basket (not shown) for receiving a commodity is put. A reading window 103 is formed on a front surface of the body 102, and a keyboard 104 is fixed at a top of the body 102. The commodity taken out of the shopping basket located on one side of the sacker table 100 is passed before a front surface of the reading window 103, and is then received into another shopping basket (not shown) located on the other side of the sacker table 100. During the course of this operation, a bar code provided on the commodity is read from the reading window 103 of the bar code scanner 101. In the case that no bar code is provided on the commodity or the bar code is stained or broken, a commodity data is input by using the keyboard 104.

When an operator inputs the commodity data through the keyboard 104, she operates the keyboard 104 as alternatley looking at the commodity and the keyboard 104. However, as there is a variation in height of operators, and the keyboard is fixed in position, some operator is obliged to keep an unnatural posture such as a height of the operator's hand or a manner of bending of the operator's wrist, causing a tendency of operator's fatigue.

OBJECT AND SUMMARY OF THE INVENTION

It is a first object of the present invention to easily adapt the inclination of the keyboard to a height of an operator.

It is a second object of the present invention to easily carry out the adjustment of the inclination of the keyboard.

It is a third object of the present invention to absorb variations in a displacement of an operating portion and a length of a wire connectd to the operating portion by a flexural operation of a spring.

It is a fourth object of the present invention to finely adjust a retracting distance of an engaging bar from an engaging portion, so as to ensure the operation.

According to a first aspect of the present invention, there is provided a commodity data inputting device comprising a bar code scanner and a keyboard for inputting commodity data; a supporting member for supporting said bar code scanner; a base for retaining said keyboard; a mounting member provided on said bar code scanner or said supporting member for pivotably mounting said base at a front end thereof in such a manner that said base is rotatable about a horizontal pivotal axis; a plurality of engaging portions formed at one of opposed side portions between said mounting member and said base and arranged along an arc defined about said pivotal axis; an engaging bar normally engaged with one of said engaging portions by a biasing force applied toward said pivotal axis; a retaining portion formed at the other of said opposed side portions for retaining said engaging bar at its opposite ends in such a manner as to permit displacement of said engaging bar toward and away from said pivotal axis; a release lever normally abutting against said engaging bar and adapted to be displaced by a biasing force larger than said biasing force applied to said engaging bar; an operating portion displaceably mounted on said mounting member for operating said release lever; a wire connected at its one end to said operating portion; and a spring connected at its one end to the other end of said wire and also connected at its other end to said release lever.

With this arrangement, an operational force of the operating portion is transmitted through the wire and the spring to the release lever to thereby retract the engaging bar from one of the engaging portions. Accordingly, the base with the keyboard can be pivoted relative to the mounting member. When an operator's hand is released from the operating portion, the engaging bar is returned by the biasing force applied thereto to engage one of the engaging portions, thereby fixing the base with the keyboard at a desired inclined position. Further, as the release lever and the operating portion are connected with each other through the wire and the spring, variations in a displacement of the operating portion and a length of the wire can be absorbed by the flexural operation of the spring.

According to a second aspect of the present invention, the commodity data inputting device as mentioned above further comprises a stopper provided in opposed relationship to said release lever for restricting displacement of said release lever, said stopper being adjusted in position in a direction toward and away from said release lever. With this arrangement, a displacement of the release lever can be restricted by adjusting the position of the stopper. Accordingly, a retracting distance of the engaging bar from the engaging portion can be finely adjusted.

Other objects and features of the invention will be more fully understood from the following detailed description and appended claims when taken with the accompanying drawings.

DETAILED DESCRIPTION OF THE PREFERRED EMBODIMENTS

Figure 6:
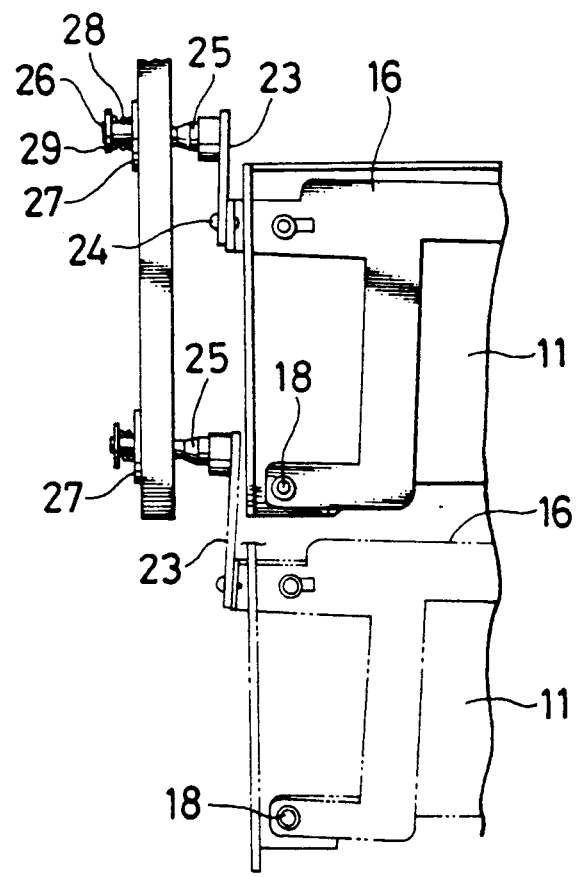
FIG. 6 is a top plan view of a left half of the mounting member.
Figure 7:
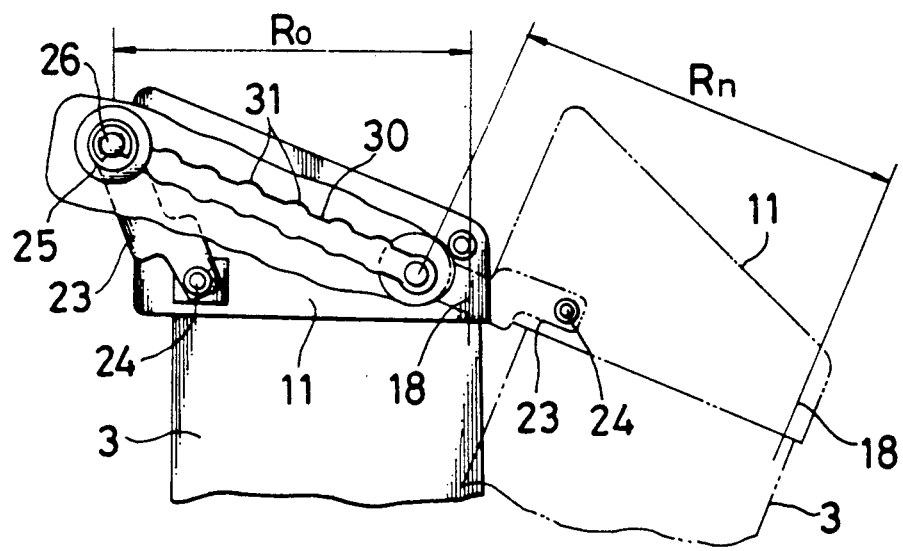
FIG. 7 is a left side view of a part of the bar code scanner, showing a pivotal motion thereof.
Figure 8:
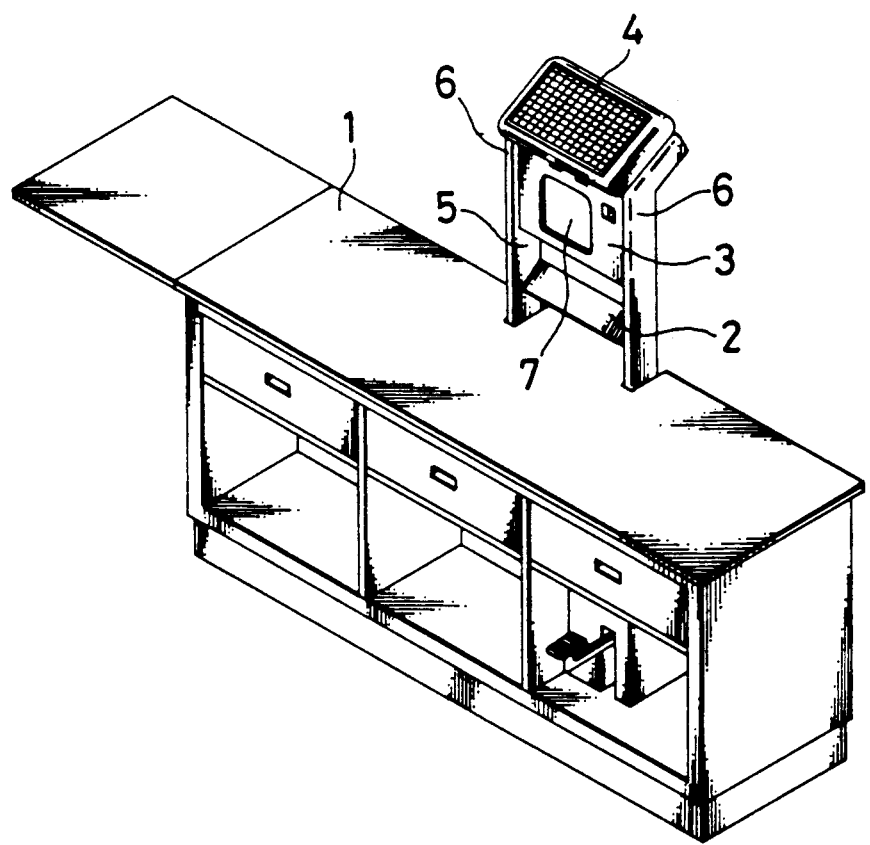
FIG. 8 is a perspective view of the preferred embodiment in connection with an associated part.
Figure 9:
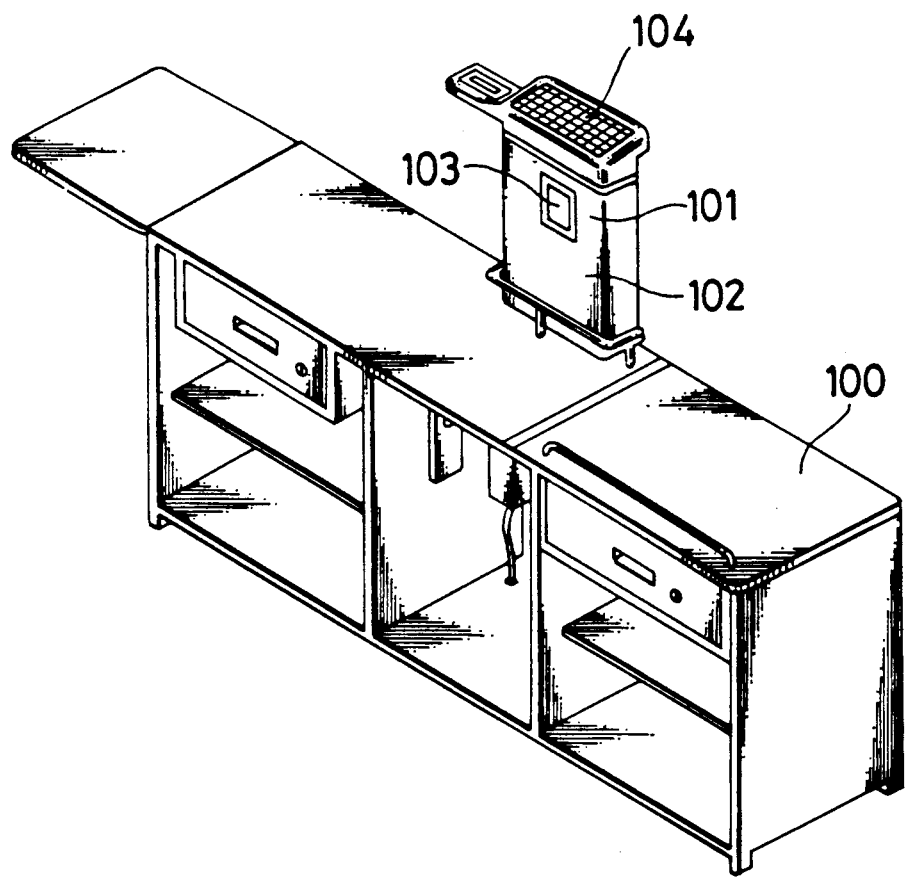
FIG. 9 is a perspective view of the prior art.

There will now be described a preferred embodiment of the present invention with reference to FIGS. 1 to 8. Referring to FIG. 8, a supporting member 5 for supporting a display 2, a bar code scanner 3 and a keyboard 4 all facing an operator are provided at a rear position of a central portion of a sacker table 1. The supporting member 5 has a pair of right and left posts 6 connected together under the sacker table 1. A reading window 7 is formed on a front surface of the bar code scanner 3.

Figure 3:
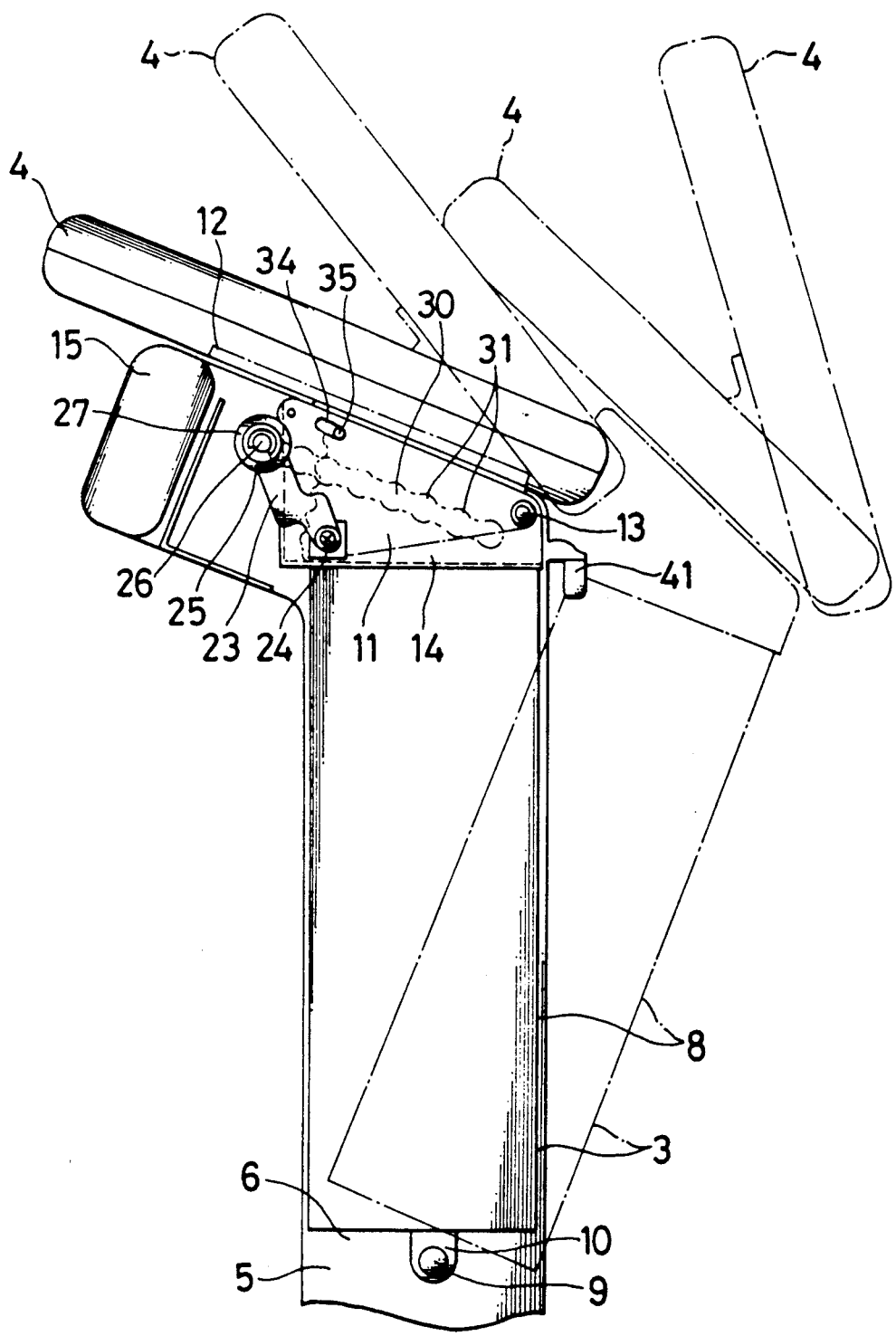
FIG. 3 is a left side view of the preferred embodiment with a left post of the supporting member omitted.

Referring to FIg. 3 which is a left side view of the preferred embodiment with the left post 6 omitted, a housing 8 of the bar code scanner 3 is formed at its opposite side lower ends with a pair of downward projections 10, and a pair of pivotal shafts 9 having a horizontal axis for pivotably supporting the downward projections 10 are fixed to the right and left posts 6. The housing 8 is provided at its upper end with a mounting member 11 for pivotably supporting the keyboard 4. The keyboard 4 is provided at its lower surface with a base 12. A pair of right and left side portions 32 of the base 12 are pivotably supported at their front ends to a pair of right and left side portions 14 of the mounting member 11 by means of a pair of horizontal pivotal shafts 13. Another display 15 facing a customer is mounted on a rear surface of an upper portion of the supporting member 5.

Figure 4:
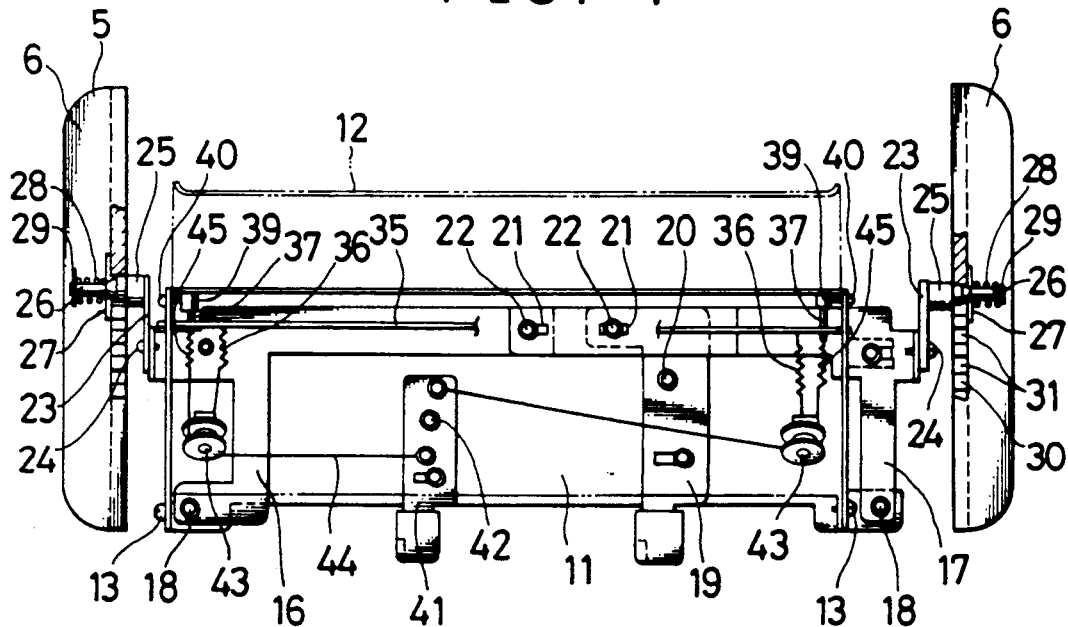
FIG. 4 is a top plan view of the supporting member and the mounting member.
Figure 5:
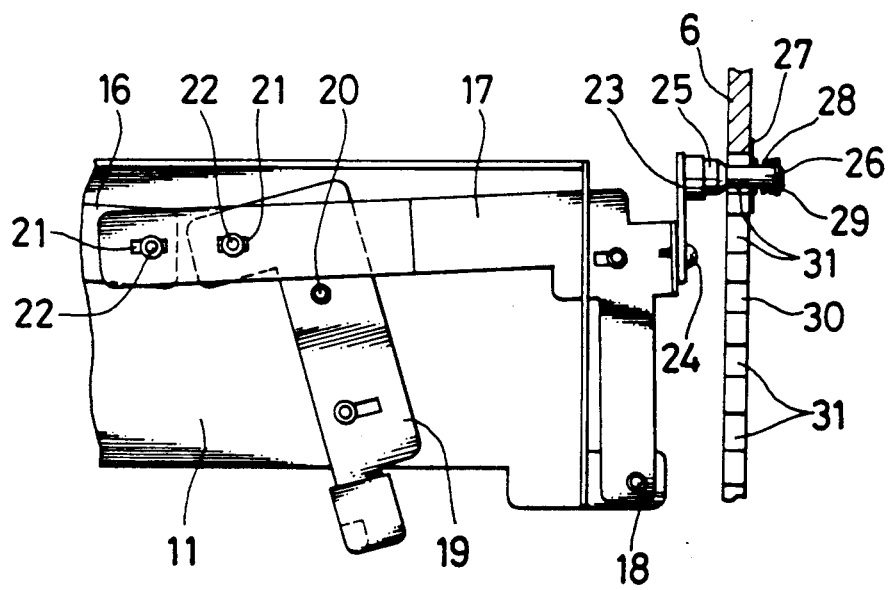
FIG. 5 is a top plan view of a right half of the mounting member.

Referring to FIG. 4 which is a top plan view of the supporting member 5 and the mounting member 11, a pair of right and left levers 17 and 16 having a substantially L-shaped configuration are pivotably supported to the mounting member 11 by means of a pair of pivotal shafts 18 having a vertical axis, and a first operating lever 19 is pivotably supported to the mounting member 11 by means of a pivotal shaft 20 having a vertical axis. The levers 16 and 17 are interlockably connected together at their inner end portions by means of an enlongated hole 21 and a pin 22, and the right lever 17 and the first operating lever 19 are also interlockably connected together by means of an elongated hole 21 and a pin 22. A pair of plate-like connecting members 23 are pivotably mounted at their one end portions to outer ends of the levers 16 and 17 by means of a pair of horizontal pivotal shafts 24 in such a manner as to be pivotable on vertical planes. A pair of engaging shafts 25 are mounted on the other end portions (pivotal ends) of the connecting members 23 in such a manner as to project sideward in opposite directions. The engaging shafts 25 are integrally formed at their outer ends with respective small-diameter portions 26 through tapering portions. A pair of disk-like sliding members 27 contacting the outer side surfaces of the right and left posts 6 and a pair of springs 28 are engaged with the small-diameter portions 26, and a pair of stop rings 29 are fixed at the outer ends of the small-diameter portions 26. The right and left posts 6 are formed with respective guide grooves 30 for slidably guiding the small-diameter portions 26 in a direction perpendicular to the axis thereof. Each guide groove 30 is formed at its upper and lower edges with a plurality of engaging recesses 31 arranged at given intervals and adapted to be selectively engaged with the corresponding engaging shaft 25. Each guide groove 30 is inclined upwardly toward the rear side of the posts 6 at a given angle with respect to an arc to be defined about the pivotal center (each pivotal shaft 9) of the bar code scanner 3.

Figure 1:
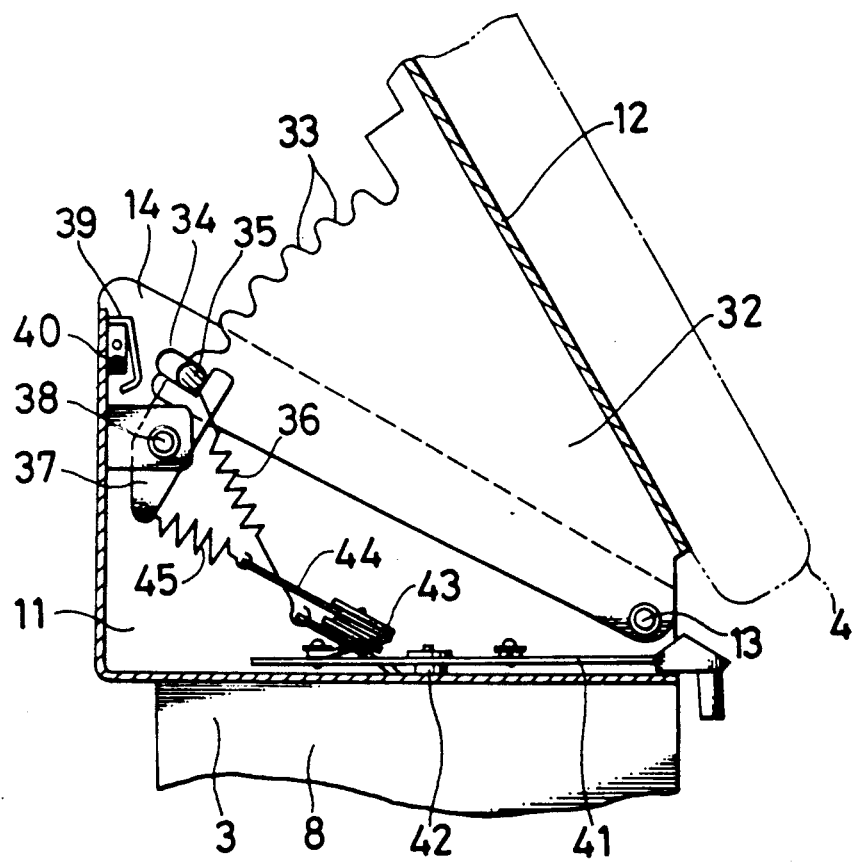
FIG. 1 is a vertical sectional side view of a supporting structure of the keyboard according to a preferred embodiment of the present invention.

Referring next to FIG. 1 which is a vertical sectional side view of the mounting structure of the base 12 of the keyboard 4 to the mounting member 11 of the bar code scanner 3, the right and left side portions 32 of the base 12 are formed with a plurality of engaging portions 33 arranged zigzag along an arc defined about each pivotal shaft 13. On the other hand, the right and left side portions 14 of the mounting member 11 are formed with a pair of elongated holes 34 as the retaining portion according to the present invention. Each elongated hole 34 is long in a radial direction of the arc defined about the pivotal shaft 13. A single engaging bar 35 engaging any one of the engaging portions 33 is retained at its opposite ends to the elongated holes 34. A pair of springs 36 are engaged under tension with the opposite ends of the engaging bar 35 and the mounting member 11, thereby elastically engaging the engaging bar 35 with the engaging portion 33. Further, a pair of release levers 37 contacting the engaging bar 35 are pivotally supported through a pair of pivotal shafts 38 to the right and left side portions 14 of the mounting member 11, and a pair of stoppers 39 facing the rear surfaces of the release levers 37 are pivotably supported through a pair of pivotal shafts 40 to the rear surface of the mounting member 11 in such a manner that a positon of each stopper 39 is a direction of rotation about the corresponding pivotal shaft 40 can be adjusted to be fixed. Further, a second operating lever 41 as the operating portion according to the present invention is pivotably supported through a pivotal shaft 42 to the bottom portion of the mounting member 11, and a pair of pulleys 43 are rotatably mounted on the bottom portion of the mounting member 11 at opposite positions with respect to the second operating lever 41. As shown in FIGS. 3 and 4, two wires 44 are fixedly connected at each one end to the second operating lever 41 at opposite positions with respect to the pivotal shaft 42, and are wrapped around the pulleys 43. The other ends of the two wires 44 are connected through a pair of springs 45 to the release levers 37. The springs 45 have a spring constant greater than that of the springs 36.

In the condition shown in FIG. 4, as each engaging shaft 25 is engaged with one of the engaging recesses 31 of the corresponding guide groove 30, the pivotal motion of the bar code scanner 3 is inhibited. When the first operating lever 19 is rotated counterclockwise about the pivotal shaft 20 under the above condition, the right lever 17 is rotated counterclockwise about the right pivotal shaft 18 by the interlocking connection with the first operating lever 19, thereby retracting the right engaging shaft 25 from the right engaging recess 31. At the same time, the left lever 16 is rotated clockwise about the left pivotal shaft 18 by the interlocking connection with the right lever 17, thereby retracting the left engaging shaft 25 from the left engaging recess 31. Under the condition, the bar code scanner 3 can be rotated about the pivotal shafts 9 as shown in FIG. 3. In this condition, the sliding member 27 engaging the small-diameter portions 26 of the engagins shafts 25 are press-contacted with the outer side surfaces of the posts 6 by the pressure of the springs 28, so that an axial displacemnt of the engaging shafts 25 may be limited. Accordingly, when an operator's hand is released from the first operating lever 19, the engaging shafts 25 are returned by the biasing force of the springs 28 to quickly engage a selected one of the engaging recesses 31. Therefore, excess rotation of the bar code scanner 3 due to its dead weight can be prevented.

As mentioned above, the bar code scanner 3 can be rotated to a desired position, thereby properly directing the reading window 7 of the bar code scanner 3 to a bar code of a commodity even when a height of the commodity taken by an operator varies with a difference in height of operators. Accordingly, any operators can read the commodity data in a natural posture irrespective of a difference in height of the operators, thereby reducing a fatiguer of the operators even after working for a long period of time.

Although the engaging shafts 25 are connected through the connecting members 23 to the levers 16 and 17 in the above preferred embodiment, the engaging shafts 25 may be connected directly to the levers 16 and 17. In this case, since the engaging shafts 25 are moved along the arc defined about the pivotal shafts 9, the guide grooves 30 are so formed as to conform with this arc.

The more the bar code scanner 3 is inclined, the more the center of gravity of the bar code scanner 3 is moved away from a vertical line passing through the pivotal shafts 9, with the result that a moment of the bar code scanner 3 due to the dead weight is increased. When the bar code scanner 3 is inclined frontward as shown in FIGS. 6 and 7, the mounting member 11 is moved frontward together with the levers 16 and 17, and the engaging shafts 25 are also moved to front one of the engaging recesses 31. At this time, since the guide grooves 30 are inclined upwardly toward the rear side of the mounting member 11 at a given angle with respect to the arc defined about the pivotal shafts 9 as a locus of rotation of the bar code scanner 3, the connecting members 23 are rotated about the pivotal shafts 24, and are laid relative to the levers 16 and 17 as shown in FIG. 7. As a result, a distance between the pivotal center of each lever 16 (17) (the axis of the pivotal shaft 18) and the center of each engaging shaft 25 as viewed in parallel to the bottom surface of the mounting member 11 is increased from $R_O$ to $R_n$ ($R_O < R_n$), where $R_O$ represents the distance when the bar code scanner 3 is in a vertical position as shown by a solid line in FIG. 7, and $R_n$ respresents the distance when the bar code scanner 3 is in a most-inclined position as shown by a phantom line in FIG. 7. That is, a leverage of the lever 16 (17) corresponding to the distance $R_O$ in the vertical positon is increased to a leverage of the lever 16 (17) corresponding to the distance $R_n$ in the most-inclined position. Accordingly, assuming that a rotative angle of the first operating lever 19 is fixed, a retraction amount of each engaging shaft 25 is increased from the vertical position to the most-inclined position. As a result, a deflection amount (a compression amount) of each spring 28 is increased from the vertical position to the most-inclined position, thereby increasing a press-contact force of each sliding member 27 against the outer surface of the corresponding post 6. As a result, a sliding resistance of each sliding member 27 against the corresponding post 6 is increased in proportion to an increase in the press-contact force. Thus, when the bar code scanner 3 is inclined, that is, as the moment of the bar code scanner 3 is increased, the sliding resistance of each sliding member 27 against the corresponding post 6 can be increased in proportion to such an increase in the moment of the bar code scanner 3 due to its dead weight. Therefore, excess rotation of the bar code scanner 3 due to its dead weight can be prevented.

Next, the adjustment of an inclined angle of the keyboard 4 itself will now be described. As shown in FIG. 1, the engaging bar 35 is elastically engaged with one of the engaging portions 33 of the base 12, and the keyboard 4 with the base 12 is accordingly maintained in a desired inclined position. When the second operating lever 41 is rotated counterclockwise as viewed in FIG. 4 about the pivotal shaft 42 from the above condition, the two wires 44 are drawn inside to rotate the release levers 37 in a counterclockwise direction as viewed in FIG. 1 about the pivotal shafts 38. As a result, the engaging bar 35 is urged by the release levers 37, thus permitting the keyboard 4 with the base 12 to be rotated about the pivotal shafts 13. At this time, when the release levers 37 are rotated at a predetermined angle, they come into abutment against the corresponding stoppers 39. Under the condition, the engaging bar 35 is not completely released from the engaging portion 33. However, when a torque is applied to the base 12 under the condition, the engaging bar 35 is forcibly urged by the engaging portion 33 to permit rotation of the base 12. Thus, a given braking force is applied to the base 12 during rotation, thereby preventing excess rotation of the keyboard 4. Further, when the second operating lever 41 is rotated at a large angle to largely rotate the release levers 37, the release levers 37 come into contact with the stoppers 39 and then deflect the same to further rotate. However, a rotative angle of the release levers 37 is limited by the position of the stoppers 39. Further, variations in a displacement of the second operating lever 41 and a length of the wires 44 can be absorbed by a flexural operation of the springs 45.

Figure 2:
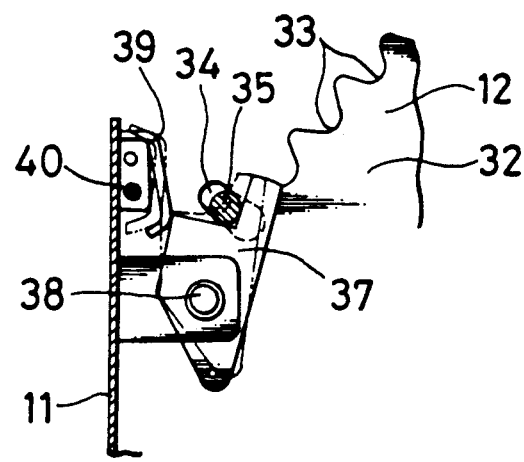
FIG. 2 is an enlarged view of a part of FIG. 1, showing a position adjusting operation of the stopper.

Further, since the engaging bar 35 is not completely released from the engaging portion 33 by the stoppers 39 in a normal rotative condition of the release levers 37, an excess rotation of the release levers 37 can be restricted by the stoppers 39. Accordingly, when the operator's hand is released from the second operating lever 41, the engaging bar 35 is returned by the return force of the spirngs 36 to quickly engage one of the engaging portions 33. At the same time, the returning operation of the release levers 37 is assisted by the abutting force of the engaging bar 35 due to the biasing force of the springs 36, thereby effecting a quick returning operation of the release levers 37. Accordingly, an excess rotation of the bases 12 and the keyboard 4 due to inertia can be prevented. Furthermore, as shown in FIG. 2, the position of the stoppers 39 adapted to contact the release levers 37 can be adjusted in the rotational direction about the pivotal shafts 40. Accordingly, the permissible rotative angle of the release levers 37 and the displacement of the engaging bar 35 can be finely adjusted. Moreover, by providing an elasticity to the contacting portion of each stopper 39 contacting the corresponding release lever 37, a pressure due to this elasticity can be applied to each release lever 37, thereby adjusting an operational force of the second operating lever 41.

As mentioned above, the keyboard 4 can be rotated to a desired angle independently of the rotation of the bar code scanner 3. Accordingly, in the case of using the keyboard 4 under the circumstances where the bar code on the commodity is stained or broken, or no bar code is provided on the commodity, that inclined angle of the keyboard 4 may be adjusted to an arbitrary angle according to the height of the operator. Thus, the operator can input the commodity data by using the keyboard 4 in a natural comfortable posture.

While the invention has been described with reference to specific embodiments, the description is illustrative and is not to be construed as limiting the scope of the invention. Various modifications and changes may occur to those skilled in the art without departing from the spirit and scope of the invention as defined by the appended claims.

What is claimed is:

1. A commodity data inputting device comprising a bar code scanner and a keyboard for inputting commodity data; a supporting member for supporting said bar code scanner; a base for retaining said keyboard; a mounting member provided on said bar code scanner for pivotably mounting said base at the front end thereof in such a manner that said base is rotatable about a horizontal pivotal axis; a plurality of engaging portions arranged along an arc defined about said pivotal axis and formed on at least one of a plurality of opposed side. portions located between said mounting member and said base; an engaging bar normally urged into engagement with one of said engaging portions by a biasing force applied toward siad pivotal axis; a retaining portion formed adjacent an other of said opposed side portions for retaining at least one end of said engaging bar in such a manner as to permit displacement of said engaging bar toward and away from said pivotal axis; a release lever normally abutting said engaging bar and adapted to be displaced by a biasing force larger than said biasing force applied to said engaging bar; an operating portion displaceably mounted on said mounting member for operating said release lever; a wire connected at one end thereof to said operating portion; and a spring connected at the one end thereof to the other end of said wire, and at the other end thereof to said release lever.

2. The commodity data inputting device as defined in claim 1 further comprising a stopper provided in opposed relationshiip to said release lever for restricting displacement of said release lever, said stopper being adjusted in position in a direction toward and away from said release lever.

* * * * *